United States Patent Office 2,900,018
Patented Aug. 18, 1959

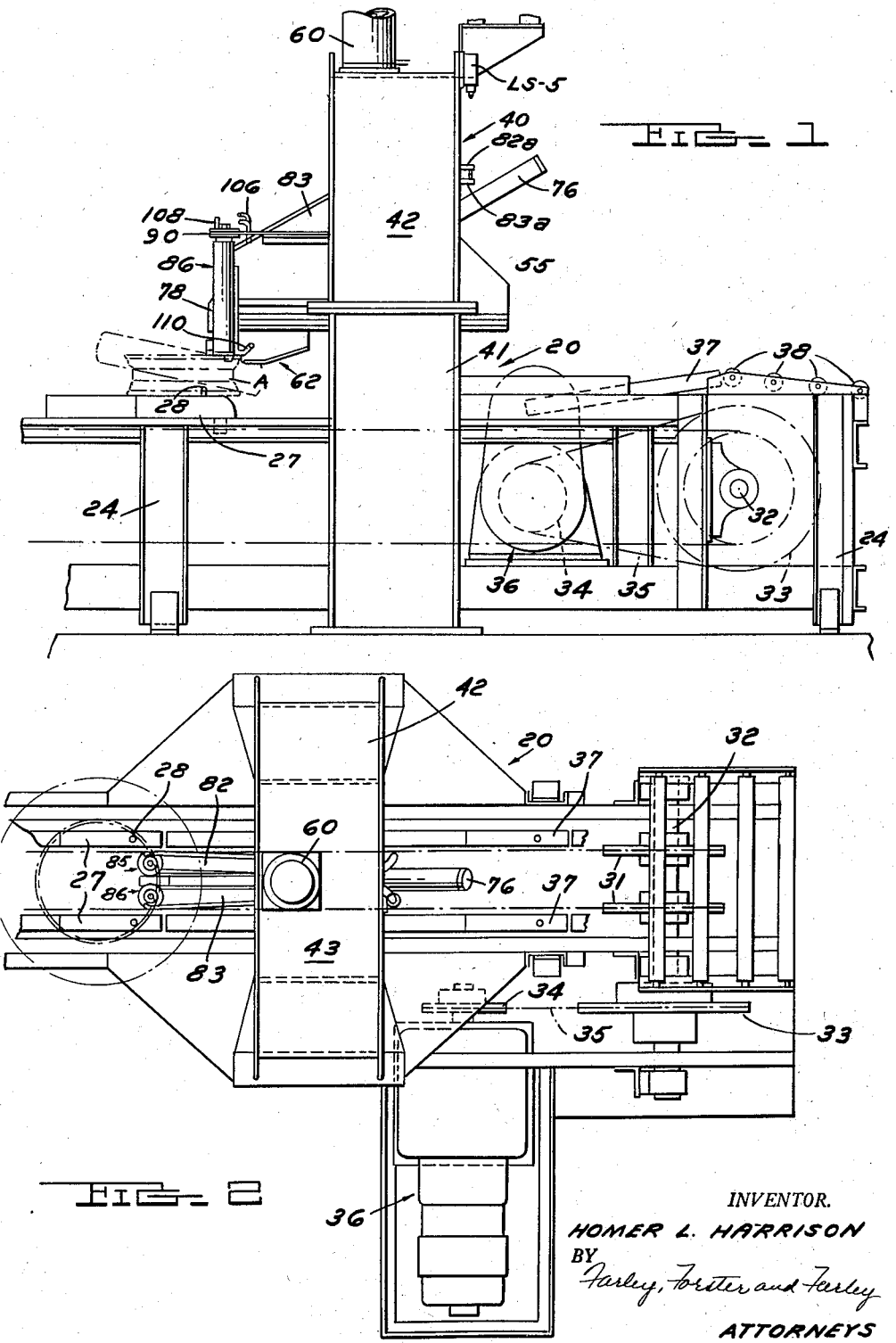

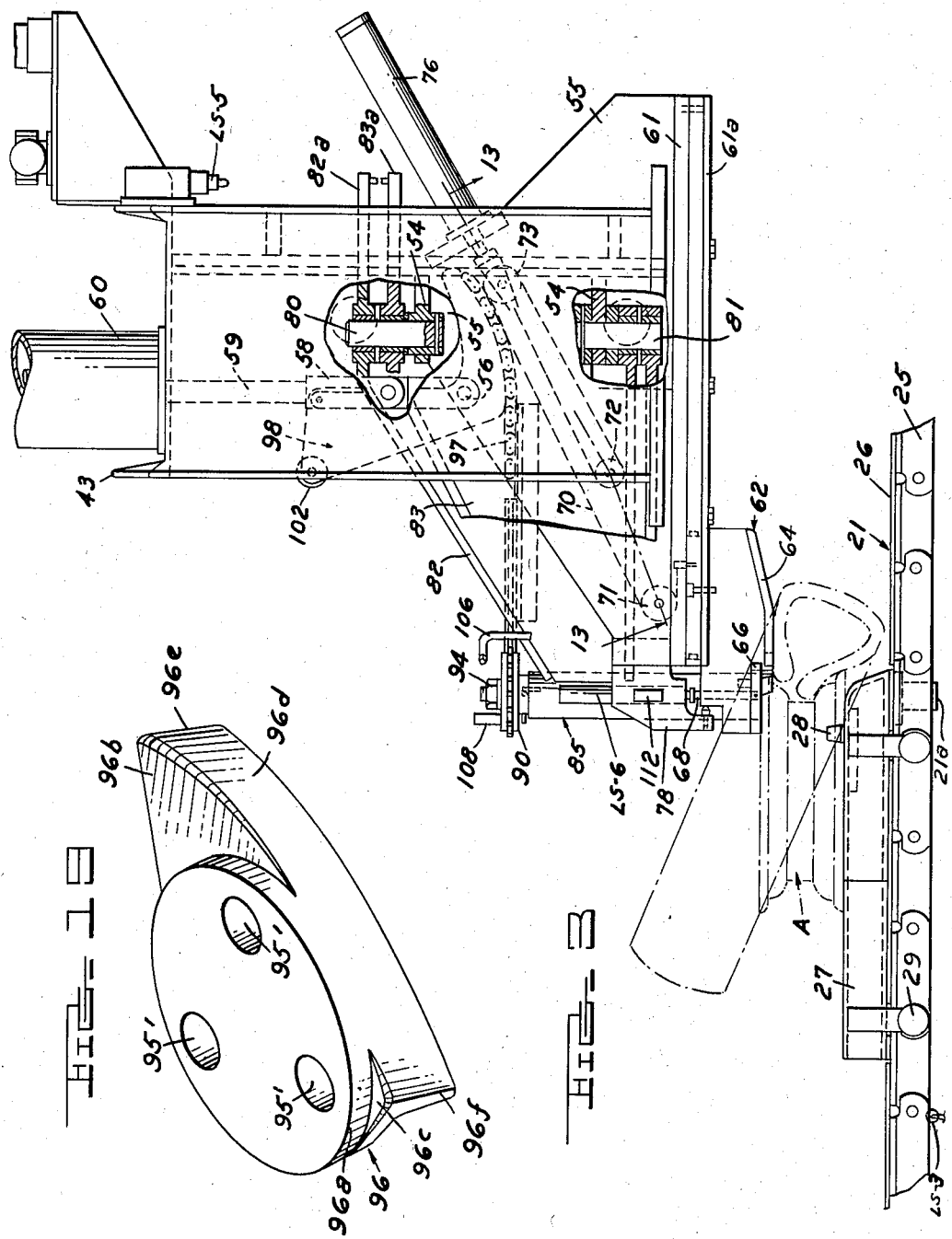

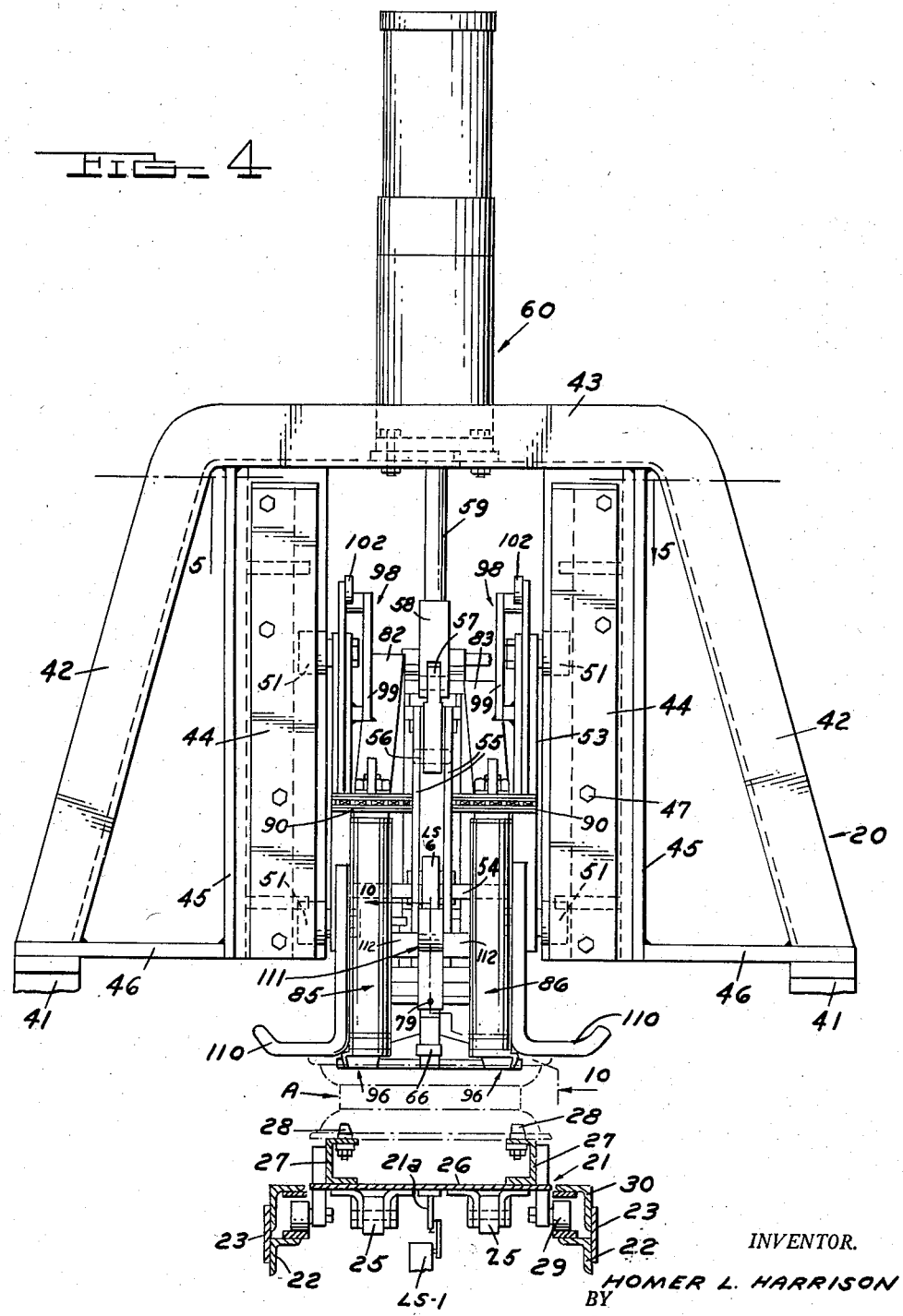

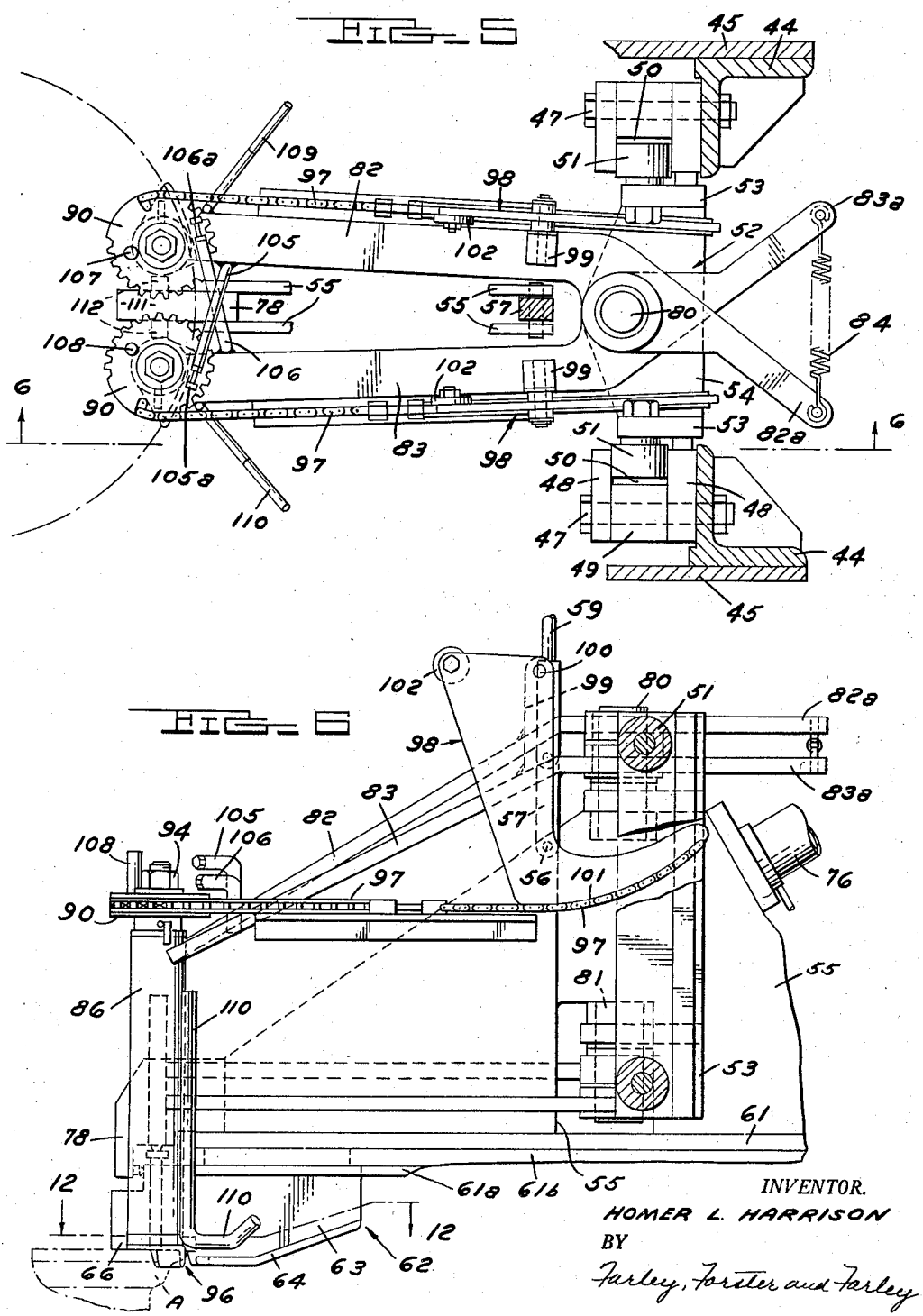

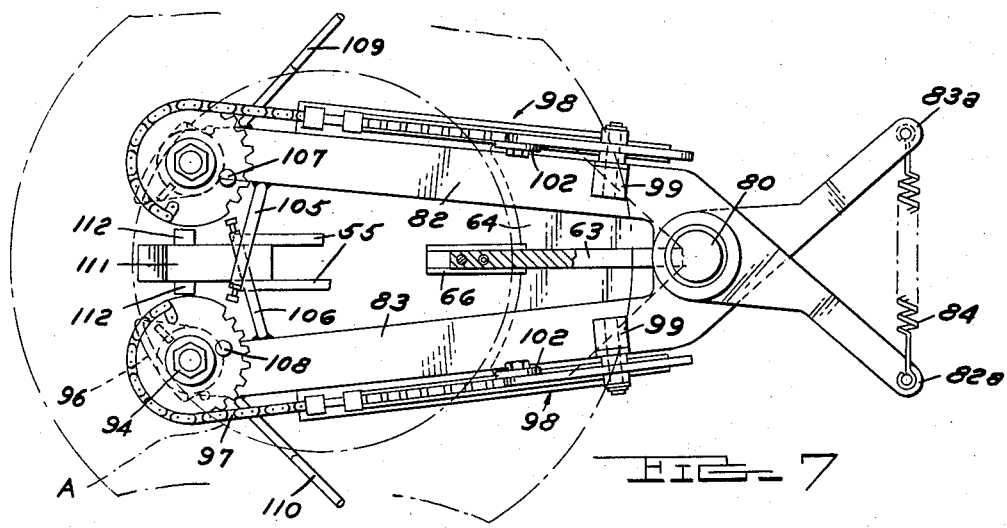
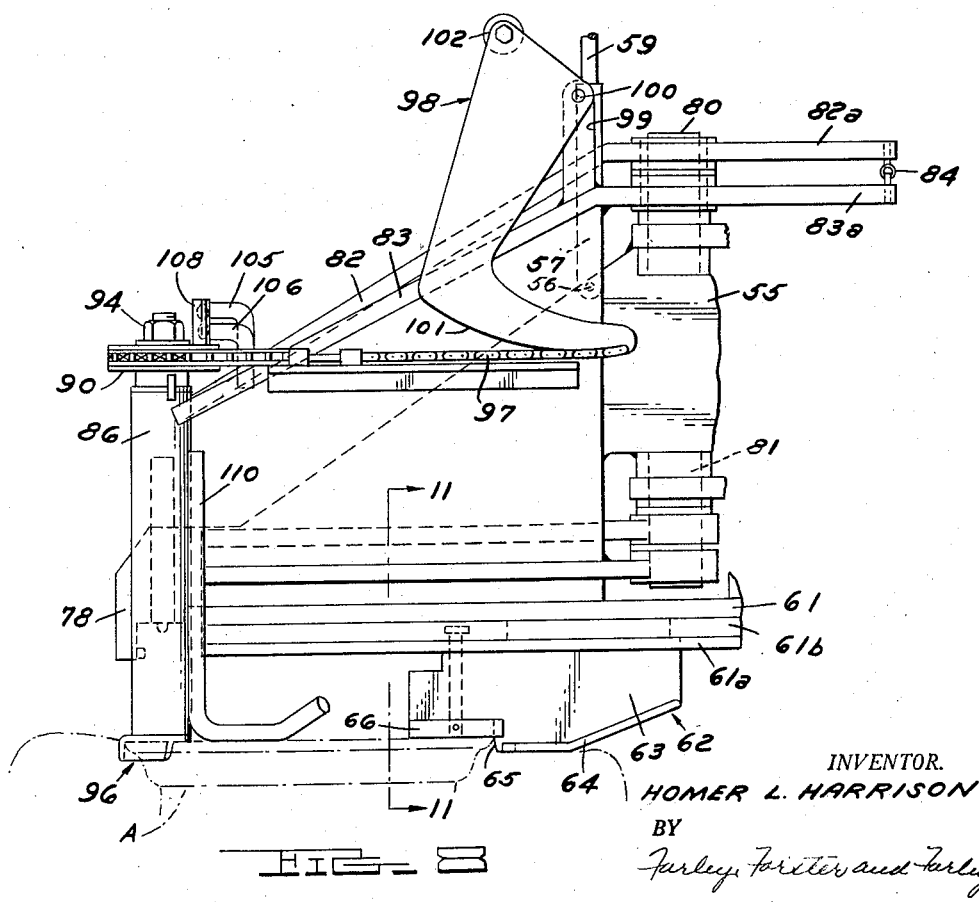

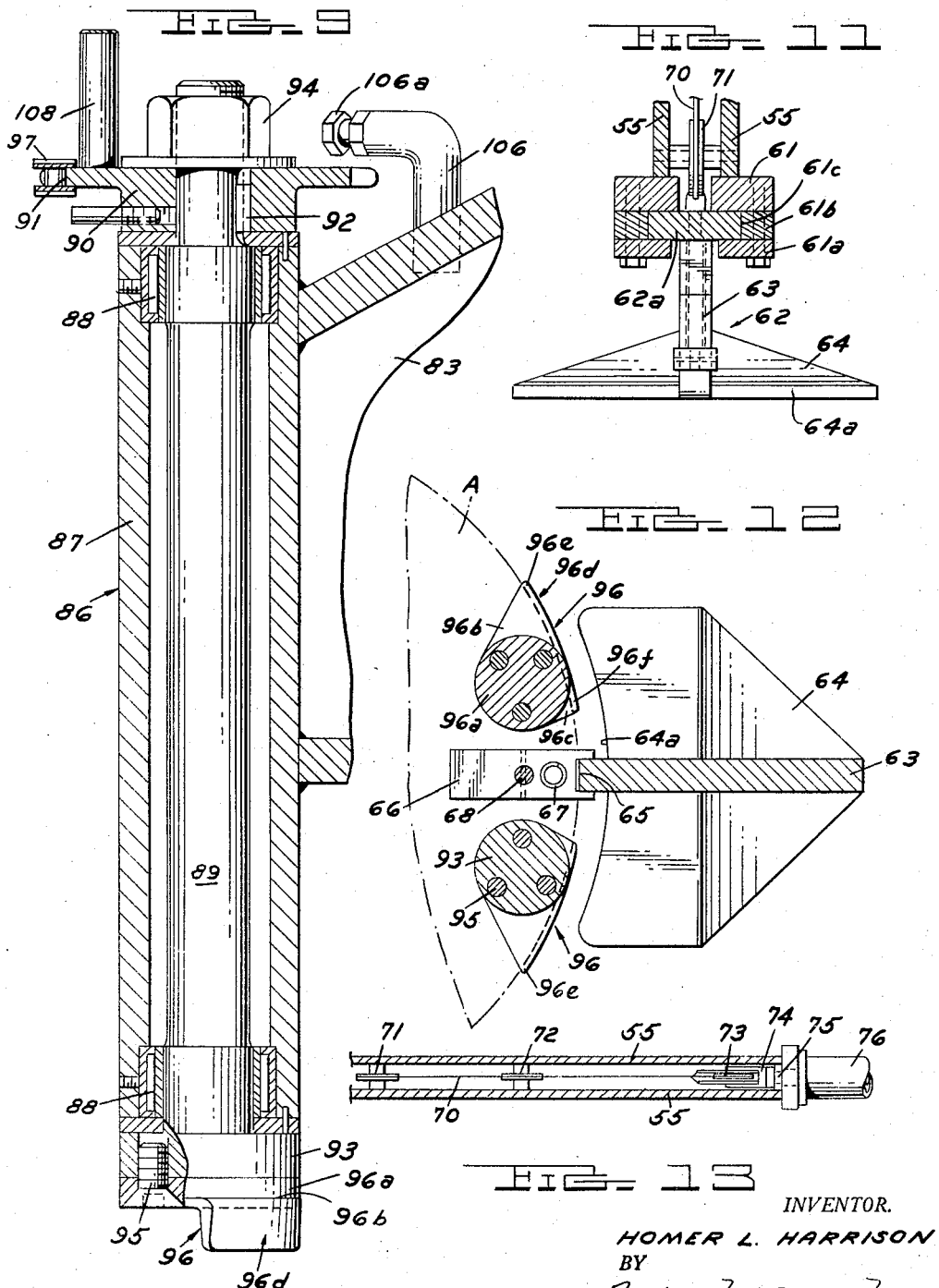

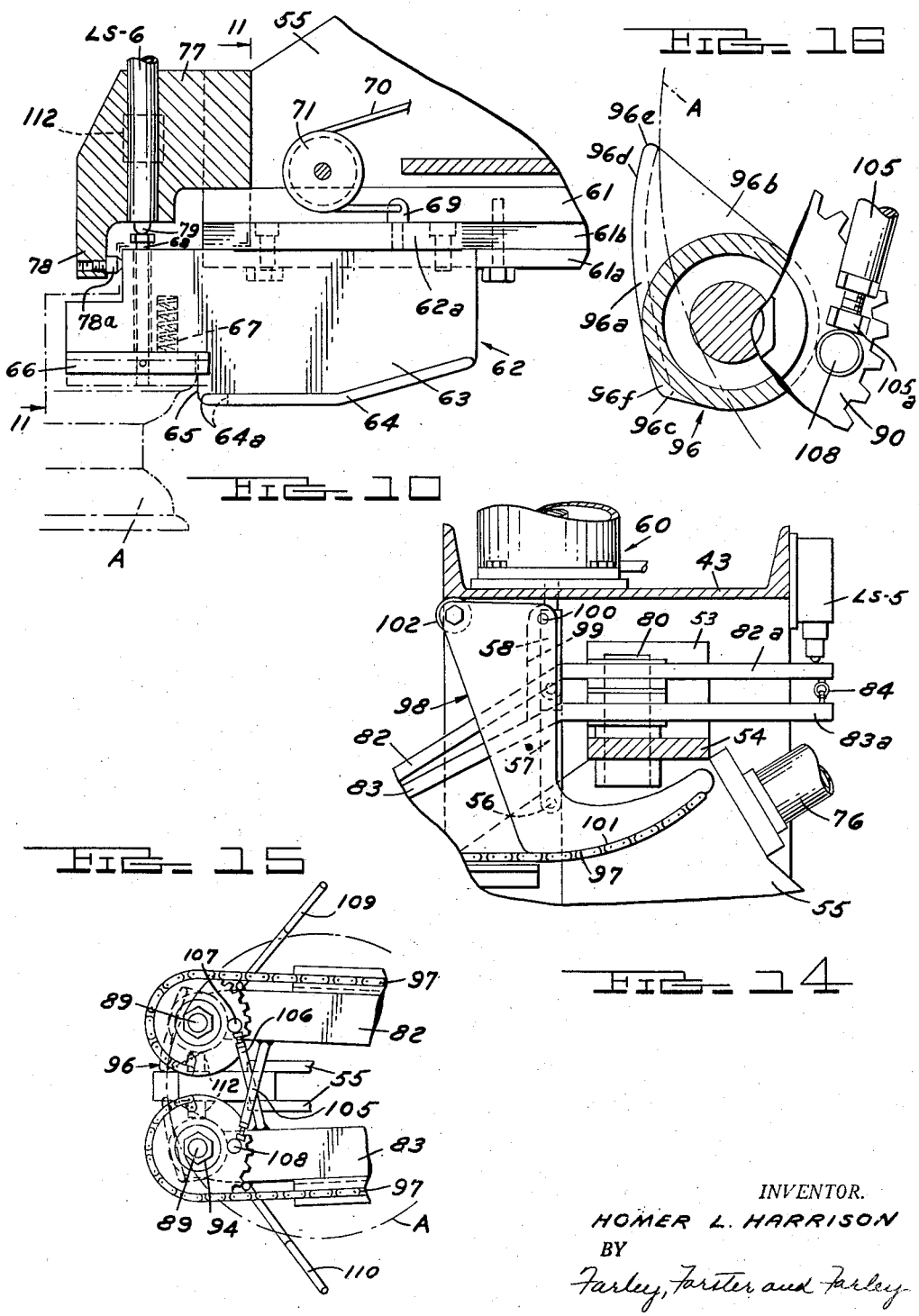

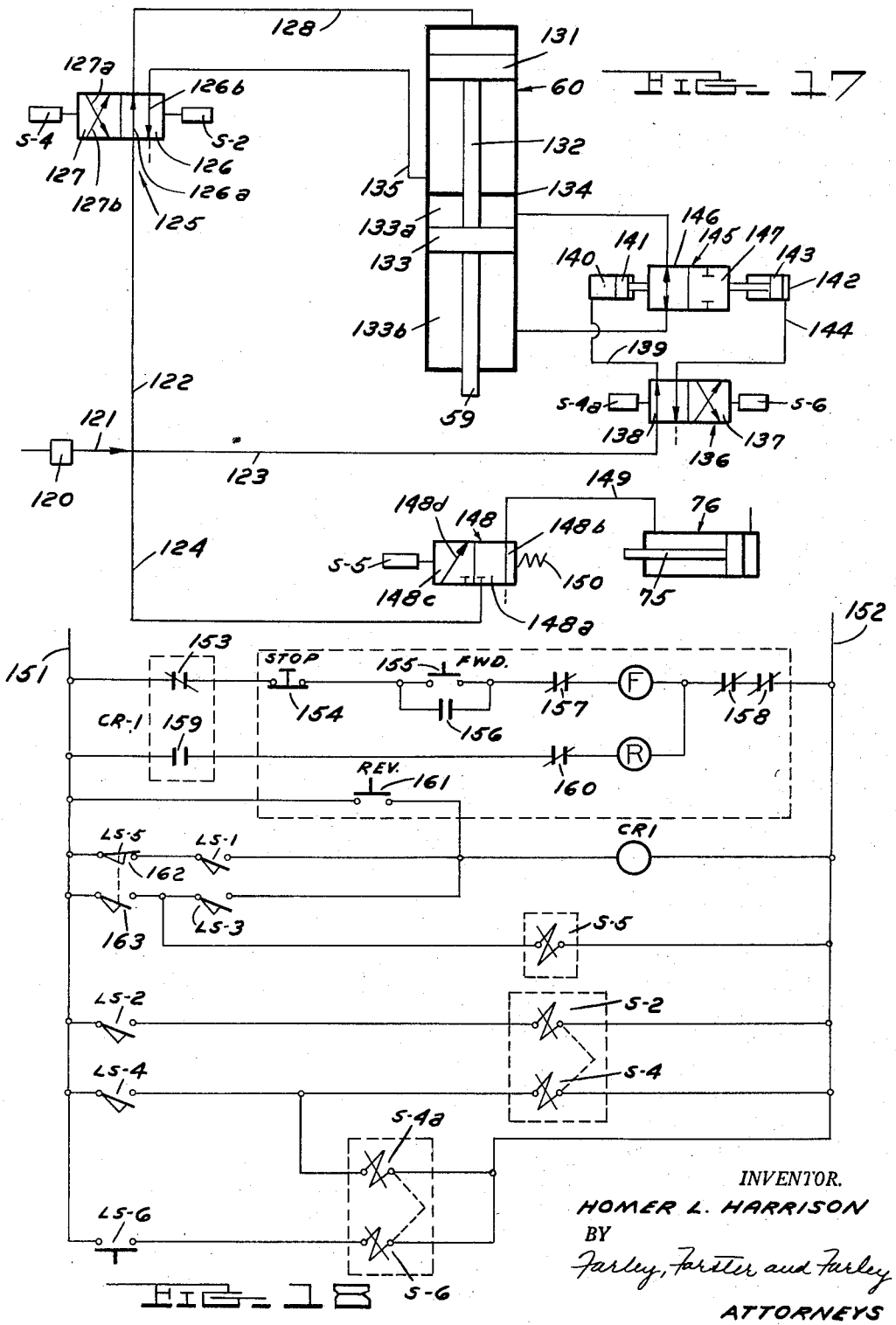

2,900,018
CONVEYOR MOUNTED AUTOMATICALLY ADJUSTING UNIVERSAL TIRE MOUNTING MACHINE

Homer S. Harrison, Detroit Mich., assignor to Allied Steel and Conveyors, Division of the Sparks-Withington Company, Jackson, Mich., a corporation of Ohio Application February 20, 1956, Serial No. 566,414

13 Claims. (Cl. 157—1.24)

The present invention relates to a tire mounting machine and more particularly to a machine adapted to mount tires on wheels of widely varying wheel diameters and widths, interchangeably and without any necessity of manual adjustment or physical change in the machine for different wheel sizes.

In my prior Patent No. 2,665,747, issued on January 12, 1954, for Automatically Adjustable Tire Mounting Machine and Conveyor, I disclosed a tire mounting machine in which a mounting head was automatically adjustable to individual wheel widths and which was adapted to mount tires on two different wheel diameters, the latter feature requiring gauging mechanism responsive to the different wheel diameters and a pair of cylinders incorporated in the mounting arms having an extended position for the larger diameter wheel and a retracted position for the smaller diameter wheel, together with a valve control responsive to the wheel diameter gauging mechanism for controlling the position of the mounting arm cylinders.

In the present tire mounting machine, the cylinders for extending and retracting the length of the mounting arms are eliminated by utilizing a pair of pivotal mounting arms of a fixed length and universally operative on virtually all passenger car and truck wheel diameters rather than being limited to two wheel diameters alone. The pivotally mounting arms are disposed upon a fixed pivot post extending generally axially of the wheel, the arms being journaled on the post for movement radially of the wheels to follow the wheel periphery.

The present invention also provides a novel wheel engaging shoe which is always interposed between the tire bead and the wheel rim and in reactive engagement therewith to prevent any damage to the tire bead during mounting and also to guidingly urge the tire over the rim. The shoes are disposed upon the mounting arms in such manner that the arm terminal ends themselves also aid in guiding the tire bead over the wheel rim. The shoes are normally freely pivotal to follow the wheel periphery as the wheel is advanced, and the shoes guide the mounting arms so that the free ends of the arms follow the wheel periphery. The shoes are additionally actuated to spread the tire bead during the final phase of the mounting operation to facilitate final assembly of the tire onto the wheel.

To assure accurate initial registry of the shoe with the wheel, a novel shoe return mechanism is employed, the mechanism being actuated upon removal of the mounting head from engagement with the wheel after the tire mounting operation has been completed. The actuating means for the mounting head is provided with improved means for gauging wheel width and for holding the mounting head at a proper level corresponding to the wheel width during the tire mounting operation. The power for performing the mounting operation is derived from the movement of the tire along the conveyor, thus simplifying the tire mounting mechanism.

It is, therefore, an important object of the present invention to provide a simplified tire mounting machine universally and automatically adapted to virtually all wheel diameters employed in both passenger and commercial road vehicles.

Another object is the provision of an improved suspension for the mounting head automatically adjustable to individual wheel widths.

It is a further object to provide a tire mounting machine having a pair of fixed length arms provided with wheel engaging means for guiding the arms in complementary arcuate paths about the periphery of a wheel to force a tire onto a wheel.

Yet another important object is the provision of an improved tire mounting mechanism utilizing fixed length, pivotal arms carrying shoes for engaging a wheel periphery and interposed between the wheel periphery and an associated tire for guidingly urging the tire over the wheel rim.

It is still another object of this invention to provide a tire mounting machine having rim-engaging shoes adapted to be interposed between the rim and a tire and actuatable for movement relative to the rim to additionally tension the tire bead during a tire mounting operation.

These and other features of the invention will be more apparent from the following detailed description of a preferred embodiment of my invention and from an examination of the drawings disclosing such embodiment wherein:

On the drawings:

Figure 1 is a fragmentary side elevational view of a tire mounting machine of the present invention;

Figure 2 is a plan view of the machine in Figure 1;

Figure 3 is an enlarged, fragmentary, side elevational view similar to Figure 1, with parts broken away and in section, illustrating the position of the tire mounting head at the initiation of a tire mounting operation;

Figure 4 is a fragmentary front elevational view of that portion of the machine shown in Figure 3;

Figure 5 is a greatly enlarged, fragmentary sectional view taken along the plane 5—5 of Figure 4;

Figure 6 is a fragmentary sectional view taken along the plane 6—6 of Figure 5;

Figure 7 is a view similar to Figure 5 illustrating the positions of the tire mounting arms at a point which the tire mounting operation is virtually complete;

Figure 8 is a view similar to Figure 6 illustrating the machine in its condition of Figure 7;

Figure 9 is a vertical sectional view taken through the outer extremity of one of the mounting arms;

Figure 10 is an enlarged sectional view taken along the planes 10—10 of Figure 4;

Figure 11 is an enlarged fragmentary sectional view taken along the plane 11—11 of Figure 8;

Figure 12 is an enlarged fragmentary sectional view taken along the planes 12—12 of Figure 6;

Figure 13 is a fragmentary sectional view taken along the plane 13—13 of Figure 3;

Figure 14 is a fragmentary sectional view similar to Figure 8, but illustrating the shoe return mechanism in its returned position;

Figure 15 is a fragmentary plan view similar to Figure 7, but illustrating the relative position of the tire mounting arms at the completion of the mounting operation;

Figure 16 is a greatly enlarged fragmentary view similar to Figure 15, eliminating some of the ancillary structure, but illustrating the position of the mounting shoes at the end of the mounting operation;

Figure 17 is a schematic representation of the fluid pressure apparatus utilized to control the vertical position of the tire mounting head;

Figure 18 is a schematic representation of a wiring diagram utilized for controlling the machine; and Figure 19 is a perspective illustration of the wheel rim-engaging shoe.

As shown on the drawings:

In Figure 1, reference numeral 20 refers generally to a tire mounting machine of the present invention.

*Conveyor and frame structure*

As best seen in Figures 1, 2, 3 and 4, the machine 20 comprises an elongated conveyor, indicated generally at 21, and having transversely spaced angle irons 22 supported by longitudinally extending supports 23 raised above the floor level by upstanding side posts 24. Upon the angle irons 22 is supported a chain conveyor comprising drive links 25 pivotally joined together and secured to the under surface of longitudinally extending platforms 26. The platforms 26 have secured thereto raised pallet rails 27 carrying vertically extending guide pins 28 effective to position a wheel, indicated generally at A, on the rails in overlying relationship.

A wheel A is thus supported on each pallet defined by the rails 27, the rails having out-rigger wheels 29 rollingly engaging a trackway provided by the angle irons 22, the wheel actually being confined between the angle irons 22 and an overlying guiding angle iron 30. The chain links 25 are driven by suitable means, as by drive sprockets 31 disposed on a shaft 32 and driven, as by sprockets 33 and 34 and a chain 35, from a suitable source of power, such as an electric motor indicated generally at 36. At the right hand end (as viewed in Figures 1 and 2) of the conveyor 21, the wheels A are lifted from the associated pallets 27 by transversely spaced inclined guide rails 37 for discharge over roller flights 38 from the conveyor assembly. The pallets 27 are fixed to the conveyor 21 and are returned in a leftward direction (Figures 1 and 2) about the drive sprockets 31.

Thus, the conveyor 21 provides means for longitudinally moving a wheel A through the tire mounting machine.

As best illustrated in Figures 1, 2 and 4, an A-frame 40 is provided to laterally straddle the conveyor 21 and to extend generally thereover. The A-frame 40 comprises lower vertical posts 41 disposed on either side of the conveyor and an arched upper member 42 formed of double flanged heavy steel stock and having an upper transversely extending supporting section 43 overlying the conveyor. The tire mounting assembly is generally disposed within the confines of the A-frame, with the exception of the tire mounting arms which project therefrom longitudinally of the conveyor, as will be later explained.

*The tire mounting head*

As best shown in Figures 4 and 5, a generally vertical trackway is supported by the A-frame 40. This trackway is provided by heavy angle irons 44 secured to vertically extending plates 45 welded to the cross member 43 of the A-frame to depend therefrom and cross braced by laterally extending supports 46. Each of the angle irons 44 has secured thereto, as by vertically spaced bolts 47, a pair of laterally spaced side plates 48 separated by a vertical block 49 to define an interior trackway 50. These trackways 50 guidingly embrace and rollingly support a pair of laterally outwardly directed guide wheels 51 mounted upon a vertically movable carriage 52, a pair of such wheels 51 being vertically spaced in each trackway 50. The carriage 52 comprises vertically extending side plates 53 joined by upper and lower transverse plates 54 and serving to support the entire tire mounting head mechanism.

The transverse plates 54 are welded or otherwise joined to a pair of closely spaced central vertical frame plates 55 carrying adjacent their upper ends a transversely extending pivot pin 56 joining the slidable mounting head to a link 57 which in turn is pivotally joined to the terminal clevis 58 of a vertically extending actuating rod 59 forming the movable portion of a fluid actuated cylinder 60. It will be appreciated that actuation of the cylinder 60 will effect vertical movement of the mounting head, this vertical movement being guided by the plurality of wheels 51 operating in their trackways 50.

Secured to the bottoms of the side plates 55, respectively, are a pair of vertically spaced slide plates 61 and 61a separated by a spacer block 61b to form a longitudinal slide 61c guiding for longitudinal movement a wheel-engaging sub-assembly indicated generally at 62. The assembly 62 includes a guide 62a entered in the slide track 61c (Figure 11) and secured to a depending vertical plate 63 having secured thereto at its lower edge a generally triangular tire-engaging plate 64. The extreme front edge 64a of the plate 64 is arcuate in contour and is adapted to engage a tire, as will be hereinafter explained in detail, to anchor the tire during a later mounting operation. The vertical plate 63 is provided forwardly of the plate 64, with a notch defining a vertical surface 65 adapted to engage a wheel rim. Forwardly of this vertical surface 65, the plate 62 carries a vertically slidable foot 66 urged by a spring 67 downwardly into engagement with the rim of the wheel A, when the wheel is in its position shown in Figure 10. Contact between the foot 66 and the rim will urge the foot 66 upwardly against the bias of the spring 67 to elevate an actuating rod 68 guided in a vertical bore formed in the plate 62. Details of the construction of the plate 63, the guide 62a, the foot 66, and the actuating rod 68 may be seen by an inspection of Figures 10, 11 and 12.

As shown in Figures 10, 11 and 13, the guide plate 61 is provided with an upstanding boss 69 to which one end of a cable 70 is secured. The cable 70 is trained about pulleys 71, 72 and 73, the pulleys 71 and 72 being secured to the side plates 55 and the pulley 73 being carried by the terminal clevis 74 of an actuating rod 75 of a one-way acting fluid pressure actuated cylinder 76 (Figure 3). The slidable sub-assembly 62 is thus slidable longitudinally of the mounting head, the movement of the sub-assembly retaining the plate 63 in contact with the wheel and accommodating travel of the wheel on its pallet along the conveyor. This movement of the slide will tension the cable 70 to extend the actuating rod 75 from the cylinder 76. Energization of the cylinder to retract the actuating rod 75 will return the slide to its forwardmost position as illustrated in Figures 3, 6 and 10 of the drawings.

As illustrated in Figures 3, 6 and 10, the side plates 55 are generally triangular in configuration and are joined at their forward ends by forwardly projecting block 77 having a forward, depending finger 78 carrying an adjustable stop 78a against which the plate 63 will abut to limit the forward movement of the slide assembly 62. The block 77 is bored to receive therein a vertically extending limit switch indicated as LS6 and having an actuating finger 79 actuated by the plunger 68 upon contact of the head with the wheel A.

*The tire mounting arms*

The upper and lower plates 54 which support the side plate 55 also support a pair of vertically spaced, axially aligned hinge pins 80 and 81, respectively. These hinge pins 80 and 81 serve to support for relative pivotal movement a pair of tire mounting arms 82 and 83, respectively. These tire mounting arms 82 and 83 are supported on the hinge pins 80 and 81 in stacked relation, the arms being generally triangular in configuration and projecting from the hinge pins 80 and 81 forwardly of the mounting head. The arms 82 and 83 each have rear ends 82a and 83a, respectively, which project rearwardly beyond the hinge pins 80 and 81 (as best shown in Figures 3 and 5), these ends being laterally deflected, in scissors-like fashion, and the free extremities of these rear ends 82a and 83a are joined by a tension spring 84, for a purpose to be hereinafter more fully described.

The arms 82 and 83 carry at their forwardly projecting ends vertically upstanding pivot posts 85 and 86, respectively. These posts are identical, and only one such post need be described in detail.

The post 86 illustrated in Figure 9 is representative and comprises a generally vertically extending tubular housing 87 which is welded or otherwise secured to the forward end of the associated arm 83. The housing 87 supports therein, as upon upper and lower needle bearings 88, a vertically extending shaft 89. Surmounting the post is a sprocket 90 having peripheral sprocket teeth 91 and co-rotatable with the shaft 89, as through a key 92. The shaft 89 is provided at its lower end with a radially enlarged head 93, and a nut 94 is threaded upon the upper end of the shaft to retain the shaft in position within the casing 86. Co-rotatably secured to the radially enlarged head 93 of the shaft 89, as by screws 95, is a rim-following shoe, indicated generally at 96 and hereinafter described in greater detail.

As viewed in Figure 5, the sprocket 90 co-rotatable with the shaft 89 has secured thereto a sprocket chain 97 adapted to engage the sprocket teeth, the other end of the chain being secured to a return arm indicated generally at 98 (Figure 6). The return arm 98 extends generally vertically in position to overlie the associated arm 82, 83. More particularly, an arm 98 is provided for each arm 82, 83, the arm 98 being supported thereon by a vertically extending post 99 secured to the associated arm 82, 83, to extend generally thereabove and to provide a laterally extending pivot pin 100 about which the arm 98 is arcuately movable in a vertical plane. Each arm 98 depends generally vertically from its associated pivot 100, the lower extremity 101 of the arm 98 being arcuate generally about the center of the pivot 100 and contacting along its arcuate length the chain 97. The forwardly projecting portion of each arm 98 carries a roller 102 for returning the arm after the mounting cycle has been completed, as to be hereinafter more fully described.

Considering now the shoes 96 located at the feet of the vertical shaft 89 carried by each of the arms 82, 83, attention is directed to Figures 12, 16 and 19 of the drawings, wherein it will be seen that the shoes 96 for each foot are mirror images of one another and comprise a circular upper portion 96a flush with the shaft head 93 and post 86 and having a leading wing 96b and a trailing wing 96c which terminate in a continuous arcuate down-turned flange 96d defined by the depending marginal edges 96e and 96f of the wings 96b and 96c, respectively. The portion of flange 96d, along wing 96b, forms the leading edge of the shoe 96, the trailing edge being defined by the relatively shorter, continuously arcuate flange portion along wing 96c, the two flanged portions along wings 96b and 96c lying generally on opposite sides of a medial vertical axis of the foot. Fig. 19 also shows openings 95' for receiving screws 95.

The elongated arcuate flange portion along wing 96b and the relatively shorter flange portion along wing 96c merge through a central portion tangential to the circular portion 96a and are adapted to abut the rim of the wheel A when the wheel is in its position illustrated in the drawings. The advancement of the wheel longitudinally by the conveyor will retain the wheel in contact with the flanges, and the flanges will remain in contact with the rim periphery as the arms 82, 83 are spread to accommodate the passage of the wheel therebetween. The depending flange 96d reactively and guidingly engages a substantial peripheral portion of the wheel rim and is to be interposed between the rim and a tire, as will be later explained, and to guide the arms peripherally about the wheel rim as the wheel is advanced.

As best illustrated in Figures 5 and 9, the arms are provided adjacent their outer extremities with angularly disposed stops 105, 106, respectively, these stops being fixedly secured, as by welding, to the arms and projecting laterally inwardly therefrom, as shown in Figure 5, to generally overlie the upper ends of the posts 85, 86 of the adjacent arm 82 or 83. The stops are adjustable in length through threaded terminal ends 105a, 106a, respectively, and are adapted to cooperate with upstanding, rigidly fixed stop studs 107 and 108 on the arms 82, 83, respectively. These studs 107 and 108 are actually carried by the sprockets 90 surmounting the posts 85, 86, respectively, and rotation of the sprockets, as will be hereinafter described, will cause the studs 107, 108, to cooperate with the corresponding stops 106, 105, respectively.

To aid in the tire mounting operation, each arm 82, 83 carries a laterally and rearwardly extending hold-down extension 109, 110, respectively. These extensions 109, 110 are welded or otherwise secured to the corresponding posts 85, 86 and are adapted to engage a tire during the mounting of the tire on a wheel A.

The arms 82, 83 are freely pivotally disposed on the pivot pins 80, 81, the forward portions of the posts being urged together under the influence of the spring 84. To prevent abutment of the posts and to position the shoes 96 in proper relation to engage a wheel rim to either side of a longitudinal axis thereof, a stop is provided, this stop comprising a forwardly projecting bar 111 interposed between and rigidly secured to the forward ends of the side plates 55, the extreme outer end of the bar being interposed between the cylinders 85, 86 at the forward end of the arms 82, 83. Laterally projecting stop blocks 112 are carried by the bar 111 to abut the posts 85, 86 and to retain the posts in laterally spaced relation so that there will be no interference between the radially enlarged sprockets 90 at the upper end of the posts.

The control system

In Figures 17 and 18, there is disclosed a combined air, hydraulic, and electric control system for the tire mounting machine of the present invention. This control system will be discussed in connection with a detailed description of the operation of the machine, but will be briefly discussed at this time.

In Figure 17, reference numeral 120 refers to an off-on gate valve, or similar shut-off valve, disposed in the conduit 121 leading to a source of fluid, preferably air, under pressure. The conduit 121 communicates with a plurality of conduits 122, 123 and 124.

The conduit 122 leads to a four-way air valve 125 controlled by a pair of solenoids indicated as S2 and S4 energized through a pair of limit switches LS2 and LS4 to be hereinafter more fully described. The valve 125 comprises two parts 126 and 127, the part 126 having therethrough a first passage 126a effective to establish communication between the conduit 122 and a conduit 128 leading to the upper end of a combined pneumatic and hydraulic cylinder indicated generally at 60, and a second passage for connecting a conduit 135 with the atmosphere. The second valve part 127 has a pair of diagonal passages therein, one such passage 127a is adapted to connect the conduit 128 with the atmosphere, while the second passage 127b can connect the conduit 135 with the supply conduit 122.

The cylinder 60 has therein a double piston, comprising a first pneumatically actuated piston 131 joined by an actuating rod 132 to a second hydraulically controlled piston 133 mounted on the actuating rod 132, the actuating rod 132 continuing on through the cylinder with a terminal portion 59 thereof lying exteriorly of the cylinder. The cylinder is divided centrally into separate pneumatic and hydraulic compartments by a central divider 134. The fluid conduit 135 communicates with the cylinder 60 on the under side of the pneumatic piston 131.

The solenoids S2 and S4 are of the repulsion type and are controlled by a pair of limit switches LS2 and LS4, as will be later described, the solenoid S2 being energized to move the valve 125 to its position illustrated in Figure 17, and the solenoid S4 being energizable to shift the valve 125 toward establishing communication between the passages 127a and 127b with the lines 128 and 135, respectively. It will be appreciated that when the valve 125 is at the position shown in Figure 17, fluid pressure from the supply line 121 will be exerted upon the piston 131 to attempt to move the same downwardly within the cylinder 130, and when the solenoid S4 is energized, fluid pressure will be exerted upon the under surface of the piston 131 in an attempt to move the piston upwardly within the cylinder 130.

The line 123 supplies fluid from the supply line 121 to a second four-way air valve 136 controlled by a pair of solenoids S4a and S6, the solenoids being adapted to be energized under the control of limit switches LS4 and LS6, in a manner to be hereinafter described. The valve 136 is the same type of valve as the valve 125 and comprises two parts 137 and 138, the part 138 being effective to connect the fluid pressure line 123 with a conduit 139 interconnecting the source of fluid supplied with a cylinder 140 within which a single acting piston 141 is disposed. Also, the portion 138 of the valve 136 connects a second cylinder 142 to the atmosphere to control the movement of piston 143 disposed within the cylinder 142. The portion 137 of the valve 136 is provided with a pair of cross passages effective to connect the fluid source conduit 123 with the conduit 144 and to connect the conduit 139 to the atmosphere. When solenoid S4a is energized, the valve 136 occupies its indicated position, and when the solenoid S6 is energized, the valve 136 occupies its other position which the cross passages of the portion 137 are effective.

The piston 133 controls the position of an hydraulic valve 145 having a fluid flow conduit 146 therethrough effective to interconnect chambers 133a and 133b disposed on opposite sides of the hydraulic piston 133. The valve 145 also includes an obstructing portion 147 for interrupting the communication between the chambers 133a and 133b.

The fluid flow conduit 124 interconnects the source conduit 121 with an air valve 148 controlled by solenoid S5, which in turn is energized through a limit switch LS5 as will be hereinafter more fully described. The valve 148 comprises a first compartment 148a having a passage 148b effective to vent a fluid conduit 149 to the atmosphere. The second compartment 148c of valve 148 is provided with a cross passage 148d effective to interconnect the conduit 124 and the conduit 149. The conduit 149 leads to a cylinder 76 hereinbefore described and having an actuating rod 75 connectible to the return cable 70 for the slide carriage sub-assembly 62. The valve 148 is retained in its position shown in Figure 17 under the influence of a compression spring 150, energization of the solenoid S5 moving the valve to the right to the position in which passage 148d interconnects the cylinder 76 to the source of pressure fluid.

In the control circuit diagrammatically illustrated in Figure 18, reference numerals 151 and 152 refer generally to electric supply lines connected to a suitable source of electricity. The conveyor motor 36 is energized through a circuit including normally closed relay contacts 153, a stop switch 154, a forward initiation switch 155 circumvented by a holding circuit energized through relay contacts 156 controlled by relay F, normally closed relay contacts 157 openable under the control of a reverse circuit relay R. A pair of normally closed overload relay contacts 158 complete the forward drive conveyor circuit between the lead lines 151 and 152. A reverse circuit for the conveyor includes a pair of normally open relay contacts 159, a second pair of relay contacts 160 openable upon energization of the relay F in the forward conveyor drive circuit. The reverse drive relay R controlling the relay contacts 157 completes this circuit. The relay contacts 153 and 159 are controlled by a circuit relay CR1, energization of the relay CR1 opening the contacts 153 and closing the contact 159, this relay being in the conveyor energizing circuit only when the reverse push button 161 is held depressed.

The circuit relay CR1 may also be energized to interrupt the forward conveyor circuit under the control of two limit switches LS5 and LS1. Switch LS5 is a double pole switch having a first switch blade 162 which is closed whenever the mounting head of the tire mounting machine is not in its uppermost or raised position, and a second switch blade 163 which is closed whenever the mounting head is fully up. This switch LS5 is illustrated in Figures 1, 3 and 14 of the drawings, from which it will be seen that the switch contact button is actuated or depressed by the tail end 82a of the arm 82 whenever the mounting head is in its fully raised position, as illustrated in Figure 14 of the drawings.

To complete the circuit through LS5 blade 162 to the relay CR1, the limit switch LS1 must be closed. To complete a circuit through the lower switch blade 163 of the limit switch LS5 to the relay CR1, the limit switch LS3 must also be closed. In addition, the lower switch blade 163 of the limit switch LS5 can complete a circuit through the solenoid S5 which, as hereinbefore described, will move the valve 148 to the right against the bias of the spring 150 to interconnect the source of air and the cylinders 76.

Another limit switch LS2 is provided for closure to complete a circuit through the solenoid S2 for the valve 125, as hereinbefore described. A limit switch LS4 is provided to complete a circuit through the solenoid S4 to the valve 125, the limit switch LS4 also being effective to complete a circuit through the solenoid S4a for the valve 136. The solenoid S6 can be energized through the limit switch LS6.

*Operation*

In a normal operation of the machine, the conveyor 21 is energized through the hereinbefore described conveyor circuit effective to energize the motor 36. Distributed along the length of the conveyor and in advance of the mounting head of the machine are a series of limit switches, LS1, LS2, LS3 and LS4. Only LS3 is shown on the drawings, the other limit switches being beyond the scope of the drawings, i.e. further to the left of the machine as viewed in Figures 1, 2, and 3.

As the conveyor travels forwardly of the machine, i.e. to the right as viewed in Figures 1, 2, and 3, a wheel A is placed upon one of the pallets defined by the pallet side rails 27 with the pallet pins 28 projecting upwardly into the wheel to retain the wheel against displacement longitudinally of the conveyor. A tire is partially assembled upon the wheel, as illustrated in dotted outline in Figure 3, wherein it will be seen that the leading portion of the bead of the tire is placed between the wheel rims, the remainder of the tire overlying the wheel rim, so that the tire is canted upwardly and to the left as viewed in Figure 3.

As the associated pallets are advanced by the conveyor 21, a depending finger 21a depending from the pallet plate 26 contacts and trips the limit switch LS1. If the mounting head is not in its uppermost position, the conveyor stops. This operation will be readily understood from an inspection of the wiring operation in Figure 18. If the mounting head is not fully retracted or in its uppermost position, the switch blade 162 of the limit switch LS5 will be closed, and closing of LS1 will energize CR1, opening the normally closed contacts 153 to interrupt the conveyor motor energizing circuit.

If the head is in its full up or retracted position, the conveyor continues to run until the finger on the pallet trips LS2. Closure of this limit switch will establish a circuit through the solenoid S2, moving the valve 125 to its position illustrated in Figure 17, wherein the source of fluid pressure in conduit 121 is connected to the conduit 128 leading to the upper end of the cylinder 60, causing the piston 131 to move downwardly.

Further movement of the pallet will trip limit switch LS3. If the mounting head has not moved from its uppermost position, the conveyor will stop, since the head in its uppermost position will close the switch blade 163 of limit switch LS5, and the subsequent closure of LS3 will complete a circuit to the relay CR1 opening the contacts 153 and interrupting the conveyor drive circuit as hereinbefore described.

If the head is not in its uppermost position, the switch blade 163 will be opened and the conveyor drive circuit will not be interrupted.

Assuming that the head is not in its uppermost position, and that the conveyor travel continues, the head will be lowered to assume its position illustrated in Figures 3, 4, and 10. As shown in Figure 10, contact between the head and the wheel rim will result in movement of the contact plates 66 upwardly against the compression of the spring 67, moving the piston 68 upwardly to actuate the button 79 of LS6. Actuation of the switch LS6 will close a circuit through the solenoid S6, energizing the solenoid and moving the cross passages of compartment 137 of valve 136 into communication between conduits 123, 139, 144, and the atmosphere so that the piston 143 will be displaced to the left, moving the stop portion 147 of the valve 145 so as to interrupt the flow of hydraulic fluid between the passages 133a and 133b. This will hydraulically stop movement of the air actuated piston 131, retaining the head in its vertically adjusted position. The position of the head will be determined by the axial thickness of the wheel A, since axial contact between the wheel rim A and the plate 66 forming a part of the head is necessary to cease vertical head displacement.

The wheel rim A will continue to be displaced longitudinally by the conveyor sliding underneath the plate 66 until such time as the rim abuts the vertical stop surface 65 on the slide sub-assembly 62. Subsequent longitudinal displacement of the rim and wheel will cause the slide sub-assembly to be moved to the right, tensioning the cable 70 and moving the piston rod 75 to the left, as heretofore described. The slide sub-assembly 62 thus stays in contact with the wheel with the V-shaped plate 64 at the foot of the sub-assembly 62 resting firmly upon the radially outer portions of the tire as illustrated in Figure 3 of the drawings. This will anchor the tire to the wheel at the leading or lowermost portion of the tire.

The arms 82, 83 are in the positions illustrated in Figure 5 at the time that the head plate 66 contacts the wheel. The elongated flanges 96d of the arm shaft 89 contact the wheel rim, as illustrated in Figures 5 and 12 in closely spaced parallel relation to the curved forward edge 64a of the plate 64.

Continued advancement of the wheel and tire by the conveyor will cause the arms 82, 83 to spread, the flanges 96d following the periphery of the rim and overlapping the rim so as to be interposed between the rim and the tire, as illustrated in Figure 3. The post 86, the enlarged portion 93 of the shaft 89, and the upper portion of the foot 96 tangential thereto will engage the tire at the bead portions thereof, the upper bead sliding downwardly over these substantially cylindrical surfaces because of tension in the tire bead and being forcibly guided downwardly axially of the wheel to slip over the flange 96d to a position between the wheel rims. During this time, the tire tension will exert a force generally radially of the wheel against the elongated leading edge of the flange 96d, exerting a torque force upon the foot 96 and thus attempting to turn the flange inwardly toward the center of the wheel. However, in order to accomplish such a turning movement, the trailing edge of the flange 96 must be forced outwardly against the tension of a following portion of the tire bead. The reaction of the trailing portion of the flange 96d against the tire bead will prevent any twisting movement of the flange from its position in snug engagement with the wheel rim. Thus, the arms, 82, 83 will be spread radially to a maximum spread position equal to the diameter of the wheel rim. This movement of the arms is guided by the flange shoes which remain in contact with the rim as heretofore described.

After the medial portion of the wheel has passed the position of the arms, the arms move inwardly toward one another as the remainder of the wheel passes the arms. The arms thus approach the positions as shown in Figures 7 and 15. During traversing movement of the shoes along the wheel rim periphery, the post shafts 89 are rotated through an angle of approximately 180 degrees, as the posts approach one another to the position illustrated in Figures 7 and 15. This turning of the posts will cause a coincident and equal turning of the sprockets 90 surmounting the post shaft 89, so that the sprocket chains 97 are lapped about the periphery of the sprocket, exerting tension on the chain and pulling the return arms 98 to the position illustrated in Figure 8.

Further rotation of the sprockets will cause arcuate movement of the stop 108 surmounting the sprocket, the stops being arcuately movable to the positions illustrated in Figures 7 and 15. As the arms approach the stop blocks 112, the stops 108 will come into contact with the associated stop post 106 of the opposing arm. Contact between the stops 105, 106 and the studs 107, 108 occurs at the final stages of travel of the arms toward one another, as illustrated in Figure 15, and further inward movement of the arms will cause the sprocket 90, shafts 89, and shoes 96 to be turned further to the position illustrated in Figures 15 and 16, pivoting the shoes relative to the rim to remove the trailing edges of the shoe flanges 96d from contact with the rim. It will be understood that the flanges 96d are interposed between the tire and the rim, actually between the tire bead and the rim of the wheel, and this continued rotational movement to remove the flange trailing edges from contact with the rim will additionally tension the tire bead and will stretch the tire bead laterally in substantially a straight line tangential to the arcuate rim. The increased tension of the tire bead will then pull the bead downwardly over the flanges and within the outline of the rim. The tire is thus free to slip axially from the flanges over the rim and onto the wheel.

Once a tire mounting operation has been completed, with the arms occupying the positions shown in Figures 15 and 16, the tire is completely assembled on the wheel.

A finger, similar to finger 21a, but on the next approaching pallet trips the limit switch LS4 which energizes the solenoids S4 and S4a. Energization of the solenoid S4 will move the valve 125 to the right so that the cross passages 127a and 127b are effective to connect the upper end of the cylinder 133 to the atmosphere and the space beneath the piston 131 to the source 121 of pressure, attempting to elevate the head upon resulting upward movement of the piston 131. Energization of the solenoid S4a will return the valve 136 to its illustrated position at which the valve portion 138 energizes the cylinder 140 to move the passage 146 of valve 145 to interconnect the piston chambers 133a and 133b for accommodating movement of the pneumatically energized piston 131. Thus, the tire mounting head is elevated from the completely assembled tire and wheel.

Elevation of the tire mounting head will bring the return arm roller 102 into contact with the upper support member 43 of the A frame 42 forcing the return arm counterclockwise to its original position illustrated in Figures 3, 4 and 6. This return movement of the return arm 98 is illustrated specifically in Figure 14 of the drawings.

At the same time, also as seen in Figure 14, the LS5 will be closed with the lower switch blade 163 closing its contact to establish a circuit through the solenoid S5, with solenoid energization interconnecting the conduits 124 and 149 to energize the cylinder 76, moving the actuating rod 75 to the right to return the slide sub-assembly 62 to its forwardmost position illustrated in Figures 3 and 10.

Thus, the machine is returned to its original condition ready for descent over the next subsequent wheel and partially assembled tire carried by the conveyor into vertical alignment with the mounting head.

The advantages residing in the present invention will be readily understood, particularly when the structure and function of the machine of the present invention is compared with that of my earlier patent, hereinbefore identified. The pivotal arms are guided by the shoes 96 for movement about the rim periphery. The pivotal attachment of the arms to a pivot location displaced axially of the wheel axis makes possible the use of arms of constant length, eliminating the heretofore necessary wheel gauging and arm extension mechanism. Further, the shoe flanges completely protect the tire bead from possible harmful abrasive contact with the wheel rim. The positive return of the arms and shoes to their original position, as through the return arm mechanism, assures accurate registration of the arm shoes with the next successive rim, while the longitudinally movable sub-assembly 62 effectively anchors the tire and the wheel rim to the machine head for the subsequent tire mounting operations.

The final additional pivotal movement of the shoes to spread the tire bead insures proper final assembly of the tire on the wheel. The rim-engaging shoes are moved radially of the wheel to a position at which a line joining the two shoes lies substantially tangential to the wheel rim and clearance between the wheel rim and the tire bead is insured. The flanged shoe structure, with its elongated leading edge and relatively shorter trailing edge, eliminates any cocking action of the arm posts, and the post bead-engaging surface is aligned radially of the wheel with the shoe and within the circumferential extent of the shoe to additionally prevent cocking and to accurately and smoothly force the tire bead over the wheel rim.

The extremely simple and effective control mechanism illustrated in Figures 17 and 18 insures accurate operation of the device, and at the completion of a tire mounting operation, the machine is in condition for the next subsequent operation. The limit switches LS1, LS2 and LS3 assure adequate safeguards for the accurate vertical registration of the mounting head with the wheel, while the operation of the limit switch LS6 accurately gauges the thickness of the wheel and insures the proper positioning of the head despite variations in wheel size. The trailing tire-engaging arms 110 aid in depressing the outer portions of the tire and in retaining the tire in its assembled relation on the wheel after the arms and shoes have caused movement of the bead over the wheel rim.

While preferred embodiments have been described above in detail, it will be understood that numerous modifications might be resorted to without departing from the scope of my invention as defined in the following claims.

I claim:

1. A tire mounting machine comprising a conveyor adapted to carry wheels having tires partially inserted between the rims of the wheel, a fixed frame adjacent said conveyor, a mounting head on said frame continuously adjustable to accommodate different wheel widths, a pair of mounting arms each reactively connected at one end to said mounting head, the other end of each of said arms including rim engaging and tire bead spreading means adapted to be interposed between a wheel rim and the associated tire bead in reactive engagement with opposite side edges of a wheel rim passing said mounting head.

2. A tire mounting machine comprising a conveyor adapted to carry wheels having tires partially positioned over the wheels, a mounting head adjacent said conveyor, a pair of arms connected to said mounting head in longitudinally fixed position relative to conveyor movement, rim engaging and tire bead spreading means pivotally mounted on each of said arms on an axis substantially parallel to the wheel axis adapted to progressively force the tire beads outwardly beyond the wheel rim as said wheel progresses past said mounting head, said means having an arcuate surface extending between wheel rim and tire bead substantially parallel to and concentric with the axis of the wheel on which the tire beads may progressively slide in moving into mounted position whereby the angular tension in the tire beads reacting against said arcuate surface may be relied upon to progressively pull the tire beads over the wheel rim into mounted position.

3. A tire mounting machine comprising a conveyor adapted to carry wheels having tires partially inserted between the rims of the wheel and a mounting head adjacent said conveyor adapted to force the rest of the tire between the rims into mounted position as said wheel passes said mounting head, characterized by a pair of tire mounting arms each pivotally mounted at one end in fixed relation to said mounting head, and rim engaging and tire bead spreading means at the other end of each of said arms for reactively engaging opposite side edges of a wheel rim passing said mounting head, including a pivotally mounted flanged element adapted for interposition between rim and tire bead, the pivotal axis of said flanged element being substantially parallel to the wheel axis, said arms being of a fixed length sufficient to accommodate a range of different wheel diameters.

4. A universal tire mounting machine comprising a wheel conveyor, a fixed frame adjacent said conveyor, a tire mounting head on said frame movable into engagement with a wheel on said conveyor, a pair of mounting arms each pivotally connected in fixed relation to said mounting head, wheel rim engaging and bead spreading means on the other end of each of said arms, said arms projecting rearwardly from said mounting head relative to the direction of conveyor travel to a position where said rim engaging means will be engaged by the leading edge of a wheel rim approaching said mounting head and automatically follow around a wheel rim, and means for partially disengaging said rim engaging means from the rim at the completion of the rim-following movement of said means to further tension the tire bead so that the tire will pass over the rim.

5. A tire mounting machine as set forth in claim 2, including means for imparting additional pivoting movement to the rim-engaging means during the final tire mounting movement thereof to increase the tension of the tire bead and to spread the same for ready movement over said rim.

6. In a tire mounting apparatus, a longitudinally traveling conveyor adapted to advance a partially assembled tire and wheel, a fixed frame defining a trackway extending generally normal to said conveyor, a movable mounting head guidingly engaging said trackway for movement therealong towards and away from said conveyor, means on said head defining a trackway extending generally parallel to said conveyor, a longitudinally movable wheel-engaging hold-down element guidingly engaging said trackway for movement relative to said head, said element being driven along said trackway from an initial position to a final position by its engagement with the wheel on said conveyor, power-means for moving said head toward and away from said conveyor and for engaging the hold-down element with said wheel, and power means for returning said hold-down element to its initial position only after said head has been moved away from the conveyor to remove said element from engagement with the wheel.

7. In a tire mounting apparatus, a continually longitudinally movable conveyor for advancing a partially assembled tire and wheel, a vertically movable mounting head fixed against longitudinal movement, a first wheel and tire engaging means on said head and movable therewith into contact with the wheel and tire for retaining the tire and wheel in partially assembled relation and for preventing displacement of the tire and wheel from the head, cooperating guide means on the head and said first means for accommodating longitudinal displacement of said first means relative to said head from an initial position to a final position as the conveyor advances the tire and wheel, second wheel and tire engaging means on said head, hinge means interconnecting said head and said second means for transverse swinging movement to accommodate following movement of said second means about the wheel periphery, power means for elevating said head from contact with said wheel and tire, and additional means for returning said first means to its initial position only after said head has been elevated.

8. In a tire mounting machine, a mounting head, supporting means for a wheel and a tire partially assembled thereon, means supporting said head for movement in a direction generally parallel to the axis of the wheel, continuously variable gauging means on said head for contacting said wheel and discriminating between all different wheel widths within a predetermined range, and fluid pressure actuated means for moving said head including hydraulic means responsive to said gauging means for holding said head in a different mounting position relative to each different width of said wheel.

9. In a tire mounting machine, supporting means for a wheel and a tire partially mounted thereon, a mounting head, a pair of mounting arms on said head, means for effecting relative arm-wheel movement, said arms, respectively, having ends movable peripherally about the wheel upon relative arm-wheel movement from an initial position at one side of the wheel to a final position on the other side of the wheel, rim-engaging means on said arms pivotal relative thereto and guidingly engaging said wheel rim, and means operative during movement of said arms to said final position to pivot said rim-engaging means relative to the wheel to establish a tangent line between said respective rim-engaging means substantially tangential to the wheel periphery so that the portion of the tire bead between said arms will pass over the wheel rim without catching on said rim.

10. In a tire mounting machine for positioning a partially mounted tire on a wheel between the rims thereof, a mounting arm having one end movable peripherally about a portion of the wheel rim, the other end spaced from the wheel center, and a rim-engaging shoe pivotally mounted on said arm having a flange contacting the wheel rim in circumferentially extended surface engagement therewith, said flange having an elongated circumferentially extending leading edge and a relatively shorter trailing edge, said edges lying on opposite sides of a radial plane of the wheel passing through the pivotal connection between the shoe and arm and serving to guide peripheral movement of said arm.

11. A tire mounting machine comprising a conveyor adapted to carry wheels having tires partially inserted between the rims of the wheels and a mounting head adjacent said conveyor adapted to force the rest of the tire between the rims into mounted position as said wheel passes said mounting head, characterized by a fixed frame for said mounting head, track means on said frame for accommodating movement of said mounting head in a direction substantially normal to the path of conveyor travel, fluid pressure means on said frame adapted to control the position of said mounting head along said track means, whereby said mounting head may be variably positioned for different wheel widths, means responsive to the approach of a wheel on said conveyor for controlling actuation of said fluid pressure means to initiate movement of said mounting head along said track means, gauging means on said mounting head adapted to register against said wheel rim, and continuously variable means responsive to said gauging means for controlling stoppage of the travel of said mounting head along said track means.

12. A tire mounting machine comprising a conveyor adapted to carry wheels having tires partially inserted between the rims of the wheels and a mounting head adjacent said conveyor adapted to force the rest of the tire between the rims into mounted position as said wheel passes said mounting head, characterized by a fixed frame for said mounting head, track means on said frame for accommodating movement of said mounting head in a direction substantially normal to the path of conveyor travel, fluid pressure means on said frame adapted to control the position of said mounting head along said track means, whereby said mounting head may be variably positioned for different wheel widths, track means on said mounting head extending parallel to the direction of conveyor travel, a member of said mounting head being provided to move along said track, said member being adapted for driving engagement by the leading edge of a wheel and including means adapted to hold the leading side wall of the tire in proper assembled relation on the wheel during the tire mounting operation.

13. A tire mounting machine comprising a conveyor adapted to carry wheels having tires partially inserted between the rims of the wheels and a mounting head adjacent said conveyor adapted to force the rest of the tire between the rims into mounted position as said wheel passes said mounting head, characterized by a fixed frame for said mounting head, track means on said frame for accommodating movement of said mounting head in a direction substantially normal to the path of conveyor travel, fluid pressure means on said frame adapted to control the position of said mounting head along said track means, whereby said mounting head may be variably positioned for different wheel widths, track means on said mounting head extending parallel to the direction of conveyor travel, a member of said mounting head being provided to move along said track means, said member being adapted for driving engagement with the leading edge of a wheel, and means for effecting reverse movement of said mounting head along its said track and means responsive to completion of the reverse movement of said head for initiating reverse movement of said member along its said track means.

References Cited in the file of this patent

UNITED STATES PATENTS

| 1,497,034 | Singleton | June 10, 1924 |
| 2,418,849 | Polt | Apr. 15, 1947 |
| 2,439,615 | Smith | Apr. 13, 1948 |
| 2,488,376 | Clauser | Nov. 15, 1949 |
| 2,534,515 | Henderson | Dec. 19, 1950 |
| 2,635,682 | Rerick et al. | Apr. 21, 1953 |
| 2,661,053 | Mullen | Dec. 1, 1953 |
| 2,665,747 | Harrison | Jan. 12, 1954 |
| 2,681,692 | Weaver | June 22, 1954 |
| 2,817,394 | Kriebel et al. | Dec. 24, 1957 |

FOREIGN PATENTS

| 161,851 | Australia | Mar. 10, 1955 |